(12) United States Patent
Boehm

(10) Patent No.: US 10,634,235 B2
(45) Date of Patent: Apr. 28, 2020

(54) DELIVERY DEVICE FOR A MOTOR VEHICLE

(71) Applicant: Continental Automotive GmbH, Hannover (DE)

(72) Inventor: Christian Boehm, Frankfurt am Main (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 15/951,303

(22) Filed: Apr. 12, 2018

(65) Prior Publication Data

US 2018/0371966 A1 Dec. 27, 2018

Related U.S. Application Data

(63) Continuation of application No. PCT/EP2016/071050, filed on Sep. 7, 2016.

(30) Foreign Application Priority Data

Oct. 13, 2015 (DE) .................. 10 2015 219 771

(51) Int. Cl.
F16H 57/04 (2010.01)
F04C 2/32 (2006.01)
F01M 1/02 (2006.01)

(52) U.S. Cl.
CPC ......... F16H 57/0439 (2013.01); F04C 2/321 (2013.01); F01M 2001/0215 (2013.01);
(Continued)

(58) Field of Classification Search
CPC ... F01M 2001/0253; F01M 2001/0238; F01M 2001/0269; F01M 2001/0215; F16H 57/0439; F04C 2/321
See application file for complete search history.

(56) References Cited

U.S. PATENT DOCUMENTS 6,234,769 B1 * 5/2001 Sakai .................. F04B 27/0895
417/374
6,863,140 B2 * 3/2005 Noreikat .................. B60K 6/40
180/65.23
(Continued)

FOREIGN PATENT DOCUMENTS

CN 103842656 A 6/2014
DE 102004005430 A1 8/2005
(Continued)

OTHER PUBLICATIONS

Dieter Voigt, "Fuel Consumption Advantages Through Control Oil Pumps", Kraftst MTZ-Motortechnische Zeitschrift, Dec. 2003 vol. 64 p. 1050-1057.
(Continued)

Primary Examiner — Christopher S Bobish

(57) ABSTRACT

A delivery device for a motor vehicle for delivering oil from an oil sump to a lubricating oil circuit of internal combustion engine has, as an oil pump, a double-stroke vane-type pump with positive guidance of vanes. A direct drive of the vane-type pump by means of the internal combustion engine is configured for an operating point P2. An increased or reduced oil demand is compensated by means of an activatable electric drive. A compact oil pump of very small dimensions may thus be used.

5 Claims, 3 Drawing Sheets

(52) U.S. Cl.
CPC .............. *F01M 2001/0238* (2013.01); *F01M 2001/0253* (2013.01); *F01M 2001/0269* (2013.01)

(56) References Cited

U.S. PATENT DOCUMENTS

| | | | | |
|---|---|---|---|---|
| 6,874,996 | B2* | 4/2005 | Iwanami | F04C 18/023 |
| | | | | 417/220 |
| 6,964,631 | B2* | 11/2005 | Moses | B60K 6/383 |
| | | | | 180/65.22 |
| 7,562,698 | B2* | 7/2009 | Fujiki | B60H 1/3208 |
| | | | | 165/11.1 |
| 8,403,646 | B2* | 3/2013 | Yoshinami | F04C 2/102 |
| | | | | 417/2 |
| 9,366,251 | B2* | 6/2016 | Sugihara | F04C 2/344 |
| 9,638,076 | B2* | 5/2017 | Nitta | F01M 1/02 |
| 10,072,660 | B2* | 9/2018 | Bohm | F16H 57/0439 |
| 10,207,710 | B1* | 2/2019 | Daims | B60W 30/18072 |
| 2003/0133809 | A1 | 7/2003 | Iwanami | |
| 2013/0151131 | A1* | 6/2013 | Laszlo | F02D 28/00 |
| | | | | 701/113 |
| 2014/0286801 | A1 | 9/2014 | Boehm | |
| 2014/0301877 | A1 | 10/2014 | Boehm | |
| 2015/0057858 | A1 | 2/2015 | Nitta | |

FOREIGN PATENT DOCUMENTS

| | | |
|---|---|---|
| DE | 102006030041 A1 | 1/2008 |
| DE | 102011084542 A1 | 4/2013 |
| DE | 102012213847 A1 | 2/2014 |
| DE | 102013213051 A1 | 12/2014 |
| DE | 112014002602 T5 | 4/2016 |
| EP | 2642126 A1 | 9/2013 |
| JP | S56161323 | 12/1981 |
| JP | S5865178 | 5/1983 |
| JP | 2002285813 | 10/2002 |
| JP | 2004143972 A | 5/2004 |
| JP | 2008151113 | 7/2008 |
| JP | 2008223631 | 9/2008 |
| JP | 2012122463 A | 6/2012 |
| JP | 2014231770 A | 12/2014 |
| WO | 2013/057752 A1 | 4/2013 |
| WO | 2014/192352 A1 | 12/2014 |
| WO | 2014/192152 A1 | 2/2017 |

OTHER PUBLICATIONS

International Search Report and Written Opinion dated Dec. 21, 2016 from corresponding International Patent Application No. PCT/EP2016/071050.

Office Action dated May 25, 2016 for corresponding German Patent Application No. 102015219771.0.

Chinese Office Action dated Sep. 29, 2019 for corresponding Chinese Patent Application No. 201680059625.2.

Japanese Notice of Allowance dated Sep. 2, 2019 for corresponding Japanese Patent Application No. 2018-519004.

* cited by examiner

DELIVERY DEVICE FOR A MOTOR VEHICLE

CROSS-REFERENCE TO RELATED APPLICATIONS

This application claims the benefit of PCT Application PCT/EP2016/071050, filed Sep. 7, 2016, which claims priority to German Patent Application 10 2015 219 771.9, filed Oct. 13, 2015. The disclosures of the above applications are incorporated herein by reference.

FIELD OF THE INVENTION

The invention relates to a delivery device for a motor vehicle for delivering oil from an oil sump to a lubricating oil circuit of an internal combustion engine or to a transmission, having an oil pump which is driven by a mechanical direct drive and by an activatable electric drive, wherein the oil pump, with a rotor and with a runner part surrounding the rotor, has two components, which are movable relative to one another, for delivering the oil, and the mechanical direct drive is connected to a first of the components that are movable relative to one another, and the activatable electric drive is connected to a second of the components that are movable relative to one another.

BACKGROUND OF THE INVENTION

A delivery device of this type is known for example from DE 10 2011 084 542 A1. In the case of the delivery device, the oil pump is driven selectively by the direct drive or by the activatable electric drive parallel operation of both drives is also possible. The delivery power of the oil pump is increased if the direct drive is running in operating state with too low a rotational speed. The state arises in rare situations in the case of high demands being placed on the internal combustion engine. This however has the effect that the oil pump must be configured for an adequate delivery power of the direct drive for the base load. In practice, this means that the oil pump must be of very large dimensions. Such large dimensioning is however very disruptive in the case of internal combustion engines.

SUMMARY OF THE INVENTION

The invention is based on the problem of further developing a delivery device of the type mentioned in the introduction such that it permits the use of a compact oil pump.

The problem is solved according to the invention in that the power of the oil pump by means of the direct drive is configured for an operating point at medium or high rotational speed of the internal combustion engine and operating temperature, and the activatable electric drive is connected to a control device for increasing the power of the oil pump to the actual requirement.

By means of this configuration, the electric drive is activated already when the internal combustion engine is running at idle, and ensures an adequate supply of oil to the transmission or to the internal combustion engine. Therefore, as an oil pump, use is made of a constant-displacement pump with a considerably lower delivery power than in the case of a constant drive. In practice, it has been found that, owing to the invention, an oil pump with a delivery volume of 20 cm$^3$ in the case of a constant drive may be replaced with an oil pump with a delivery volume of 10 cm$^3$ in the case of the activatable electric drive. The operating temperature lies at approximately 90-110° oil temperature and corresponds to the warmed-up state of the internal combustion engine that is reached during continuous operation. The medium or high rotational speed is defined on the basis of the nominal rotational speed of the internal combustion engine. Owing to the invention, the oil pump may be driven by means of the first of the components that are movable relative to one another or the second of the components that are movable relative to one another, or through the drive of both components. Since the power of the oil pump to be imparted by means of the direct drive is configured for the idle running state, the activatable electric drive is used predominantly for covering an increased demand in the presence of low rotational speeds. The operating point is thus configured for medium or low oil temperatures at the stated rotational speeds. The electric drive is then likewise activated in the presence of high temperatures or excessive temperatures.

In another advantageous refinement of the invention, the oil pump is of particularly simple construction if a pot-shaped housing structure which separates a pressure side of the oil pump from the surroundings has a narrowed portion which leads to a shaft section of the activatable electric drive, and if the narrowed portion is connected rotationally conjointly to the shaft section and is sealed off with respect to a housing part of the oil pump. By means of this configuration, the use of a particularly small diameter of the sealing ring is possible. The sealing action of the oil pump therefore exhibits particularly high reliability.

In another advantageous refinement of the invention, the delivery power of the oil pump is freely controllable in a particularly broad range if the control device has a generator mode for the deactivatable electric drive for the purposes of reducing the power of the oil pump. By means of this configuration, the electric drive is designed to, in the generator mode, transmit a braking load into the second of the movable components. If the braking load is low, the direct drive will, by means of the first of the components that are movable relative to one another and the oil to be delivered, jointly rotate the second component, which is connected to the electric drive, leading to a lower delivery power of the oil pump. If the braking load is high, the second component, which is connected to the electric drive, will be immobilized, and the oil delivery will become correspondingly high in accordance with the power of the mechanical direct drive. Owing to the invention, the second component, which is connected to the activatable electric drive, of the oil pump is moved selectively in one or the other direction, in accordance with the control by the control device. The activatable electric drive may thus be used, in the case of high rotational speeds of the mechanical direct drive, for the purposes of reducing the power of the oil pump.

In another advantageous refinement of the invention, permanent energization of the activatable electric drive is easily avoided if the component that is driven by the activatable electric drive has a freewheel or a brake for supporting the torque generated by the direct drive.

In another advantageous refinement of the invention, the support of the torque of the electric motor is realized in a particularly simple manner in terms of construction if the freewheel or the brake supports a drive shaft of the activatable electric drive with respect to a housing part.

In another advantageous refinement of the invention, particularly high efficiency and a very broad range of the delivery power is easily achieved if the oil pump is designed as a double-stroke vane-type pump with two mutually oppositely situated swept volumes. The double-stroke vane pump is particularly well-suited to the intended fields of use in the lubricating circuit of the internal combustion engine or in the transmission owing to the power that is controllable over a broad range. The commonly used gerotor pumps or gear wheel pumps are duly capable of generating high delivery pressures. However, the double-stroke vane-type pump according to the invention permits selectively high delivery pressures and/or high delivery volumes with corresponding electrical energization by means of the control device. The double-stroke nature combines the advantages of the high efficiency with a particularly small structural space.

In another advantageous refinement of the invention, upon a restart of the oil pump, an immediate delivery of oil is ensured if the double-stroke vane-type pump has a static guide element for preloading the vanes against the radially outer runner part. This configuration is advantageous in particular for the use of the delivery device for delivering oil in the lubricating oil circuit of the internal combustion engine because, in this way, the oil pump reliably delivers oil immediately after the start.

In another advantageous refinement of the invention, a further reduction of the dimensions of the delivery device is contributed to if the static guide element projects into the rotor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention permits numerous embodiments. To further illustrate its basic principle, two of these embodiments are illustrated in the drawing and will be described below. In the drawing.

DETAILED DESCRIPTION OF THE PREFERRED EMBODIMENT

The following description of the preferred embodiment(s) is merely exemplary in nature and is in no way intended to limit the invention, its application, or uses.

Figure 1:
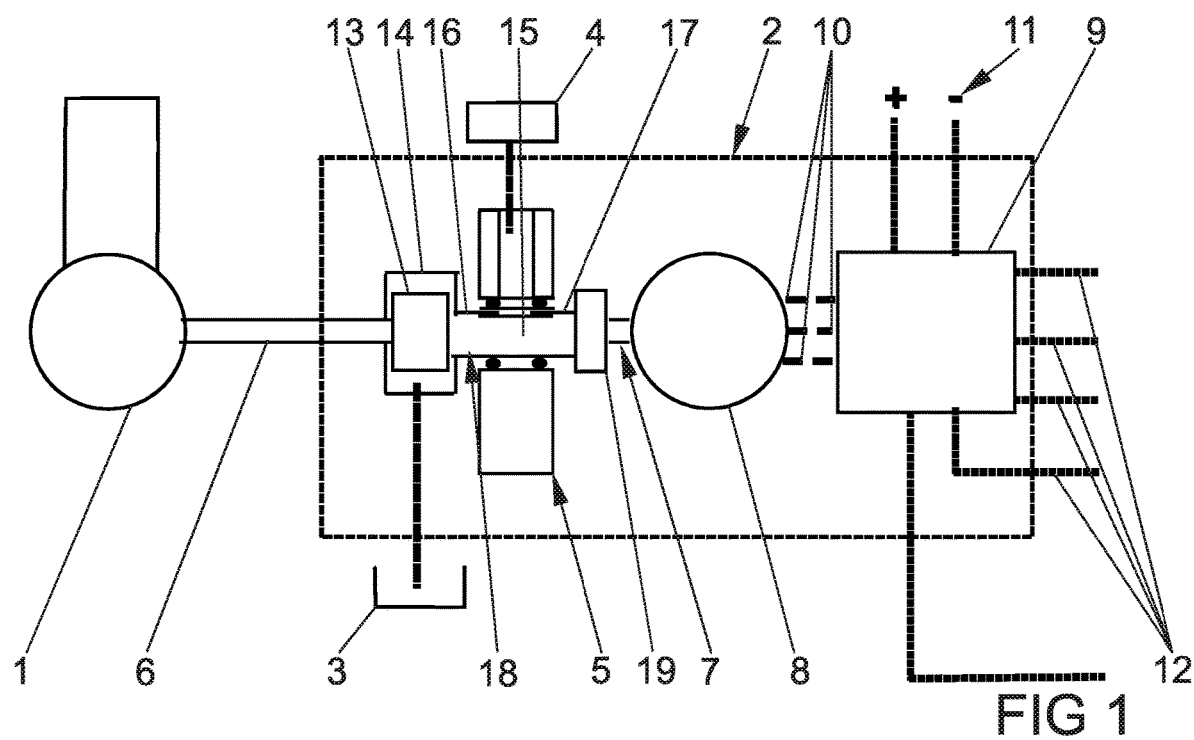
FIG. 1 schematically shows an internal combustion engine of a motor vehicle having a delivery device according to the invention, FIG. 2 schematically shows the construction of an exemplary embodiment of an oil pump of the delivery device from FIG. 1.

FIG. 1 schematically shows an internal combustion engine 1 of a motor vehicle having a delivery device 2 for delivering oil from an oil sump 3 to a consumer 4. The consumer 4 may be a lubricant circuit of the internal combustion engine 1 or a transmission (not illustrated) which is connected to the internal combustion engine 1. The delivery device 2 has an oil pump 5 with a direct drive 6 by means of the internal combustion engine 1 and an activatable electric drive 7. An electric motor 8 of the activatable electric drive 7 is connected to an electronic control device 9 which actuates the electric drive 7 via control lines 10, and which supplies electrical current from an on-board electrical system 11 of the motor vehicle, in a manner dependent on input signals such as a motor rotational speed, the demanded motor torque, the oil temperature and a setpoint pressure. For the supply of the input signals, the control device 9 is connected to signal lines 12.

The oil pump 5 has a rotor 13 and a runner part 14 surrounding the rotor 13. The rotor 13 is connected to the direct drive 6, whereas the runner part 14 is driven by the activatable electric drive 7. The oil pump 5 thus has two components, which are movable relative to one another, for delivering the oil. The oil pump 5 has a pot-shaped housing structure 16 which separates a pressure side 15 from the surroundings. The pot-shaped housing structure 16 has a narrowed portion 18 which leads to a shaft section 17 of the activatable electric drive 7. Furthermore, in the shaft section 17 of the activatable electric drive 7, there is arranged a freewheel 19 which, when the electric drive 7 is not electrically energized, supports a torque of the direct drive 6 with respect to a static component.

Figure 2:
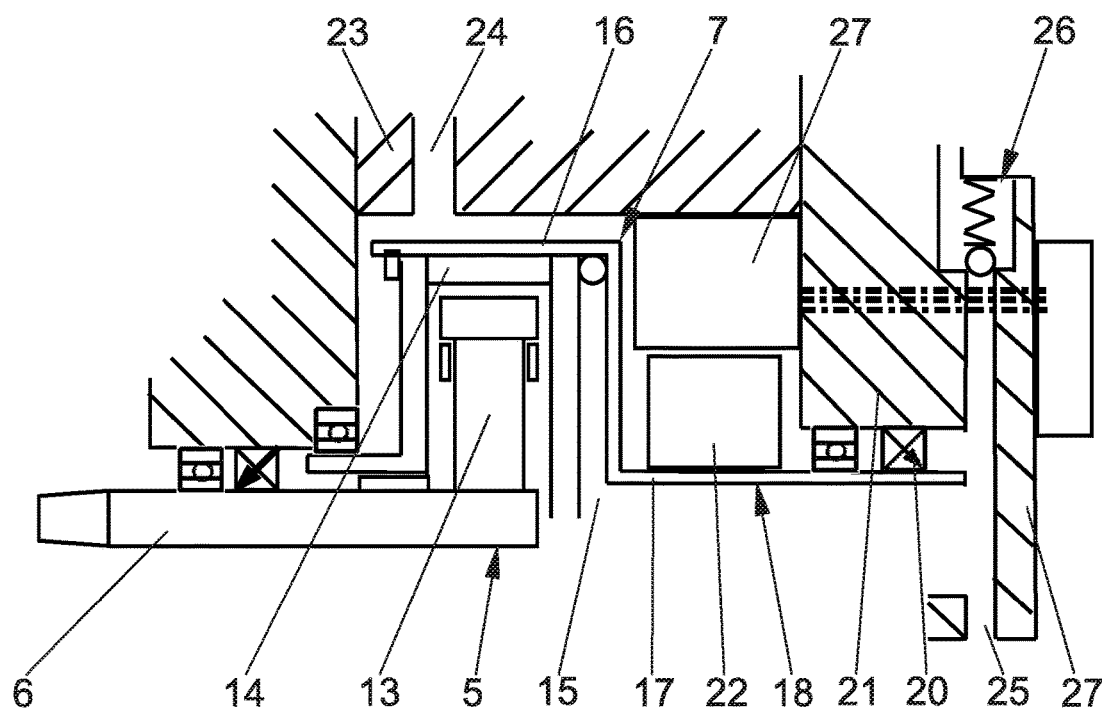

In an alternative embodiment illustrated in FIG. 2, the activatable electric drive 7 is permanently actuated by the control device 9 and is capable, if the power of the direct drive 6 is sufficient, of supporting the torque thereof. If the power of the direct drive 6 is higher than the power to be supplied to the oil pump 5, the electric drive 8 is switched into a generator mode and may thus reduce the power of the oil pump 5. In this embodiment, no freewheel is provided on the activatable electric drive 7. The embodiment as per FIG. 2 is otherwise constructed in the same way as that in FIG. 1.

FIG. 2 schematically shows an exemplary embodiment of the construction of the oil pump 5. To simplify the drawing, only one half of the oil pump 5 is illustrated. It is seen here that the narrowed portion 18 of the pot-shaped housing structure 16 is sealed off with respect to a housing part 21 of the oil pump 5 by means of a sealing ring 20. The shaft section 17 is connected to a rotor 22 of the electric drive 7. A further housing part 23 has an inlet duct 24 of the oil pump 5. The inlet duct 24 is connected to the oil sump 3 illustrated in FIG. 1. An outlet duct 25, which leads to the consumer 4 from FIG. 1, of the oil pump 5 is arranged together with an overpressure valve 26 in another housing part 27. A stator 28 of the electric drive 7 surrounds the rotor 22 and is arranged rotationally fixedly in the oil pump 5.

Figure 3:
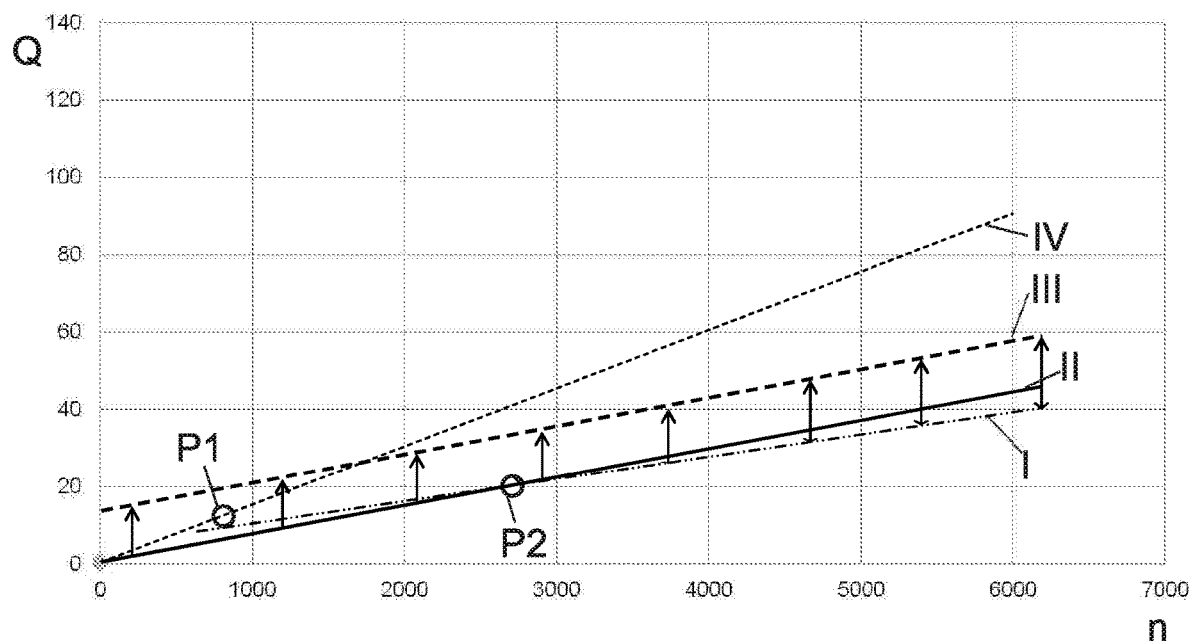
FIG. 3 shows a characteristic map relating to the design of the oil pump from FIG. 1 with a demand characteristic curve of the internal combustion engine.

FIG. 3 shows a diagram of the delivery volume of the oil pump 5 versus the rotational speed of the internal combustion engine 1. At an operating temperature of approximately 90-110° C. the internal combustion engine 1 has an oil demand Q versus the rotational speed n, which is illustrated as characteristic curve I. The power to be imparted by the direct drive 6 according to the invention is denoted by II. A maximum power of the oil pump 5 during parallel operation of the direct drive 6 and of the electric motor 7 is denoted by III. At a medium rotational speed of for example approximately 2700 revolutions per minute, the power required for the operation of the oil pump 5 corresponds to the power generated by the direct drive 6. This point is denoted in the diagram by P2. If the rotational speed of the direct drive 6 lies below the medium rotational speed, the power of the oil pump 5 is increased by activating the electric drive 7. Above the medium rotational speed, the electric drive 7 may be switched into a generator mode in order to reduce the power of the direct drive 5. Alternatively, it is also possible for excess delivered oil to be discharged via the overpressure valve 26 illustrated in FIG. 2. The arrows directed vertically upward and downward from the line II thus correspond to the increase or reduction, by means of the activatable electric drive 7, of the power generated by the direct drive 6.

A characteristic curve of a drive situation according to the prior art is denoted by IV. The design point for the drive is denoted by P1. A direct drive which ensures adequate delivery performance at a low idle running rotational speed of approximately 800 revolutions per minute would have to have this characteristic curve. A comparison of the characteristic curves IV and I clearly shows that, by means of the combination with the activatable electric drive 7, a particularly low-powered and thus compact oil pump 5 is used.

Figure 4:
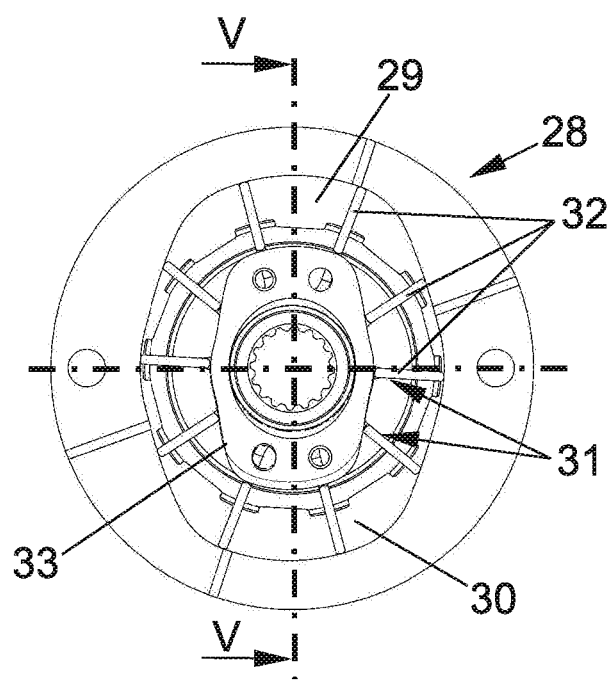
FIG. 4 is a side view of a double-stroke vane-type pump which is used as an oil pump in FIGS. 1 and 2.

FIG. 4 shows a double-stroke vane-type pump 28 which is preferably used as an oil pump 5 in FIGS. 1 and 2. The vane-type pump has two swept volumes 29, 30. The vane-type pump 28 has, in the rotor 13, guides 31 for extendable vanes 32. A static guide element 33 which projects into the rotor 13 preloads the vanes 32 radially outward against the runner part 14 of the oil pump 5. The guide element 33 has an outer contour corresponding to the inner contour of the runner part 14. The vanes 32 are subjected to positive guidance by the guide element 33, such that delivery of the oil is ensured directly upon the start of the oil pump 5. The oil pump 5 may thus also be used for delivering engine oil in a lubricating oil circuit of the internal combustion engine 1.

Figure 5:
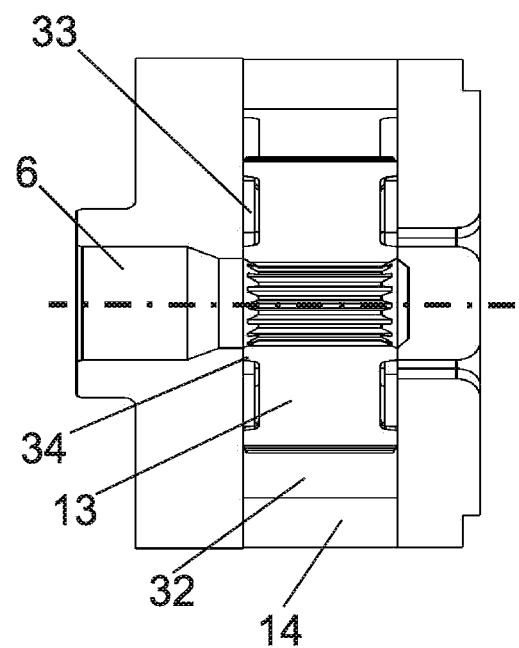
FIG. 5 is a sectional view taken along the line V-V in FIG. 4.

FIG. 5 shows a sectional illustration through the vane-type pump 28 from FIG. 4 along the line IV-IV. It is seen here that the rotor 22 is sealed off with respect to the runner part 14 by means of a sealing web 34.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A delivery device for a motor vehicle for delivering oil from an oil sump to a lubricating oil circuit of an internal combustion engine or to a transmission, comprising:
    a mechanical direct drive;
    an activatable electric drive;
    a control device, the activatable electric drive connected to the control device;
    an oil pump which is driven by at least one of the mechanical direct drive or by the activatable electric drive;
    the oil pump further comprising:
        a rotor, the mechanical direct drive being connected to the rotor; and
        a runner part surrounding the rotor, the runner part being driven by the activatable electric drive, both the rotor and the runner part being moveable relative to one another for delivering the oil;
        a pot-shaped housing structure, the pot-shaped housing structure separates a pressure side of the oil pump from surroundings;
    a freewheel being driven by the activatable electric drive such that the freewheel supports the torque generated by the direct drive, the freewheel being located between the pot-shaped housing structure and the activatable electric drive;
    a narrowed portion being part of the pot-shaped structure; and
    a shaft section which is part of the activatable electric drive, the narrow portion leads to the shaft section of the activatable electric drive, and the narrowed portion is connected rotationally conjointly to the shaft section and is sealed off with respect to a housing part of the oil pump;
    wherein the direct drive configures the power of the oil pump for an operating point corresponding to a predetermined rotational speed of the internal combustion engine and operating temperature of the internal combustion engine, and the activatable electric drive increases the power of the oil pump when the power of the oil pump is insufficient.

2. The delivery device as claimed in claim 1, wherein the freewheel supports a drive shaft of the activatable electric drive with respect to a housing part.

3. The delivery device of claim 1, the oil pump further comprising a double-stroke vane-type pump having two mutually oppositely situated swept volumes.

4. The delivery device of claim 3, the double-stroke vane-type pump further comprising a static guide element for preloading one or more vanes against the radially outer runner part.

5. The delivery device of claim 4, wherein the static guide element projects into the rotor.

* * * * *